(12) United States Patent
Zhu et al.

(10) Patent No.: US 11,537,849 B2
(45) Date of Patent: Dec. 27, 2022

(54) COMPUTER-IMPLEMENTED METHOD OF TRAINING CONVOLUTIONAL NEURAL NETWORK, CONVOLUTIONAL NEURAL NETWORK, COMPUTER-IMPLEMENTED METHOD USING CONVOLUTIONAL NEURAL NETWORK, APPARATUS FOR TRAINING CONVOLUTIONAL NEURAL NETWORK, AND COMPUTER-PROGRAM PRODUCT

(71) Applicant: BOE Technology Group Co., Ltd., Beijing (CN)

(72) Inventors: Dan Zhu, Beijing (CN); Lijie Zhang, Beijing (CN); Pablo Navarre Michelini, Beijing (CN); Hanwen Liu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 442 days.

(21) Appl. No.: 16/626,302

(22) PCT Filed: Jul. 22, 2019

(86) PCT No.: PCT/CN2019/097088
§ 371 (c)(1),
(2) Date: Dec. 23, 2019

(87) PCT Pub. No.: WO2020/140421
PCT Pub. Date: Jul. 9, 2020

(65) Prior Publication Data
US 2021/0012181 A1    Jan. 14, 2021

(30) Foreign Application Priority Data

Jan. 3, 2019    (CN) .......................... 201910005026.8

(51) Int. Cl.
*G06V 10/82* (2022.01)
*G06N 3/04* (2006.01)
(Continued)

(52) U.S. Cl.
CPC ........... *G06N 3/0454* (2013.01); *G06F 17/16* (2013.01); *G06N 3/08* (2013.01); *G06N 3/082* (2013.01);
(Continued)

(58) Field of Classification Search
CPC .. G06T 11/00–008; G06T 2207/20132; G06N 3/08; G06N 3/0454
See application file for complete search history.

(56) References Cited

U.S. PATENT DOCUMENTS

| 10,552,977 B1 * | 2/2020 | Theis ..................... G06T 11/001 |
| 2018/0068463 A1 | 3/2018 | Risser |

(Continued)

FOREIGN PATENT DOCUMENTS

| CN | 101794454 A | 8/2010 |
| CN | 102360506 A | 2/2012 |

(Continued)

OTHER PUBLICATIONS

International Search Report & Written Opinion dated Oct. 22, 2019, regarding PCT/CN2019/097088.

(Continued)

*Primary Examiner* — Sean T Motsinger
(74) *Attorney, Agent, or Firm* — Intellectual Valley Law, P.C.

(57) ABSTRACT

A computer-implemented method of training a convolutional neural network configured to morph content features of an input image with style features of a style image is provided. The computer-implemented method includes selecting a training style image; extracting style features of
(Continued)

the training style image; selecting a training content image; extracting content features of the training content image; processing the training content image through the convolutional neural network to generate a training output image including the content features of the training content image morphed with the style features of the training style image; extracting content features and style features of the training output image; computing a total loss; and tuning the convolutional neural network based on the total loss including a content loss, a style loss, and a regularization loss.

17 Claims, 4 Drawing Sheets

(51) Int. Cl.
    *G06T 7/10*     (2017.01)
    *G06F 17/16*     (2006.01)
    *G06N 3/08*     (2006.01)
    *G06T 11/00*     (2006.01)

(52) U.S. Cl.
    CPC ............... *G06T 7/10* (2017.01); *G06T 11/00* (2013.01); *G06V 10/82* (2022.01); *G06T 2207/20132* (2013.01)

(56) References Cited

U.S. PATENT DOCUMENTS

| | | | |
|---|---|---|---|
| 2018/0240257 A1* | 8/2018 | Li | G06N 3/084 |
| 2018/0357800 A1* | 12/2018 | Oxholm | G06T 11/001 |
| 2018/0373999 A1* | 12/2018 | Xu | G06N 3/08 |
| 2019/0026870 A1* | 1/2019 | Hu | G06T 5/50 |
| 2019/0138838 A1* | 5/2019 | Liu | G06N 3/02 |
| 2019/0139191 A1 | 5/2019 | Liu et al. | |
| 2019/0236814 A1* | 8/2019 | Shlens | G06T 11/00 |
| 2019/0279075 A1* | 9/2019 | Liu | G06N 3/0472 |
| 2019/0302290 A1* | 10/2019 | Alwon | G01V 1/282 |
| 2020/0126205 A1* | 4/2020 | Liu | G06K 9/6256 |
| 2020/0134778 A1* | 4/2020 | He | G06V 10/454 |
| 2020/0151559 A1* | 5/2020 | Karras | G06N 3/0472 |
| 2020/0226724 A1* | 7/2020 | Fang | G06T 9/00 |
| 2020/0286273 A1* | 9/2020 | Chen | G06T 11/60 |
| 2021/0012181 A1* | 1/2021 | Zhu | G06N 3/08 |
| 2021/0358082 A1* | 11/2021 | Zhu | G06K 9/6232 |
| 2021/0365710 A1* | 11/2021 | Zhu | G06K 9/6262 |

FOREIGN PATENT DOCUMENTS

| | | |
|---|---|---|
| CN | 106651766 A | 5/2017 |
| CN | 107240085 A | 10/2017 |
| CN | 107730474 A | 2/2018 |
| CN | 107767328 A | 3/2018 |
| CN | 107767343 A | 3/2018 |
| CN | 108470320 A | 8/2018 |
| CN | 108711137 A | 10/2018 |

OTHER PUBLICATIONS

First Office Action in the Chinese Patent Application No. 201910005026.8, dated May 25, 2020; English translation attached.
S. Li, et al., Laplacian-Steered Neural Style Transfer, arXiv:1707.01253v2 [cs.CV] Jul. 30, 2017.
X. Huang, et al., Arbitrary Style Transfer in Real-time with Adaptive Instance Normalization, arXiv:1703.06868v2 [cs.CV]Jul. 30, 2017.
F. Luan, et al., "Deep Photo Style Transfer", arXiv:1703.07511v3 [cs.CV] Apr. 11, 2017.
A. Levin, et al., "A Closed Form Solution to Natural Image Matting", IEEE Transactions on Pattern Analysis and Machine Intelligence, vol. 30, Issue: 2, Feb. 2008.

* cited by examiner

COMPUTER-IMPLEMENTED METHOD OF TRAINING CONVOLUTIONAL NEURAL NETWORK, CONVOLUTIONAL NEURAL NETWORK, COMPUTER-IMPLEMENTED METHOD USING CONVOLUTIONAL NEURAL NETWORK, APPARATUS FOR TRAINING CONVOLUTIONAL NEURAL NETWORK, AND COMPUTER-PROGRAM PRODUCT

CROSS-REFERENCE TO RELATED APPLICATION

This application is a national stage application under 35 U.S.C. § 371 of International Application No. PCT/CN2019/097088, filed Jul. 22, 2019, which claims priority to Chinese Patent Application No. 201910005026.8, filed Jan. 3, 2019. Each of the forgoing applications is herein incorporated by reference in its entirety for all purposes.

TECHNICAL FIELD

The present invention relates to display technology, more particularly, to a computer-implemented method of training a convolutional neural network, a convolutional neural network, a computer-implemented method using the convolutional neural network, an apparatus having a convolutional neural network, and a computer-program product.

BACKGROUND

In present, changing the style of an image is quite popular, people can display a style-changed image in social networks, in events, or in digital gallery. To change the style of an image, content features of the image sometimes may be morphed with style features of a reference style image, this process is called style morphing process. For example, during the style morphing process, the content of the image is kept (e.g. the scenery, the objects, or the people in the image are kept.), but the original style of the image is changed.

SUMMARY

In one aspect, the present invention provides a computer-implemented method of training a convolutional neural network configured to morph content features of an input image with style features of a style image, comprising selecting a training style image; extracting style features of the training style image; selecting a training content image; extracting content features of the training content image; processing the training content image through the convolutional neural network to generate a training output image comprising the content features of the training content image morphed with the style features of the training style image; extracting content features and style features of the training output image; computing a total loss; and tuning the convolutional neural network based on the total loss comprising a content loss, a style loss, and a regularization loss.

Optionally, tuning the convolutional neural network comprises tuning the convolutional neural network in part based on the regularization loss function generated using (1) a first equation $L_m = \Sigma_{C=1}^{3} V_C[O]^T L V_C[O]$, and (2) a first matrix obtained using a second equation $$L_{(i,j)} = \Sigma_{k|(i,j) \in W_k} w_k \left( \delta_{ij} - \frac{1}{|W_k|} \left( 1 + \frac{1}{\frac{\varepsilon}{|W_k|} + \sigma_k^2} (I_i - \mu_K)(I_j - \mu_k)^T \right) \right);$$

wherein a matrix dimension of the first matrix is N×N, N is a total number of pixels of the training content image; wherein L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; $\varepsilon$ is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector $I_j$; and each element of $\mu_k$ is an average value of elements in the window of pixels $W_k$; wherein $L_m$ represents the regularization loss function; C represents a sequential number of channels of the training content image; O is a pixel matrix representing the training output image; $V_C[O]$ represent a vectorized version of the training output image O in a C-th channel.

Optionally, tuning the convolutional neural network comprises tuning the convolutional neural network based on a weighted sum of the content loss, the style loss, and the regularization loss.

Optionally, a ratio of a weight of the content loss, a weight of the style loss, and a weight of the regularization loss is in a range of 1:1:0.1 to 2:1:0.1.

Optionally, tuning the convolutional neural network comprises tuning the convolutional neural network in part based on the content loss obtained using a third equation as follows:

$$L_{content} = \frac{1}{2C_e} \Sigma_{ij} (F_{ij}^e - P_{ij}^e)^2;$$

wherein $L_{content}$ represents the content loss function; e represents a sequential number of a convolutional layer in the convolutional neural network; $C_e$ represents a constant for normalizing a content loss value; $P_{ij}^e$ represents a value of a j-th position in an i-th channel of a content feature map output by an e-th convolutional layer using an i-th kernel, when the training content image is input into the e-th convolutional layer; $F_{ij}^e$ represents a value of a j-th position in an i-th channel of an output feature map output by the e-th convolutional layer using the i-th kernel, when the training output image is input into the e-th convolutional layer.

Optionally, the convolutional neural network comprises an encoder, an adaptive instance normalization (AdaIN) layer, and a decoder, sequentially connected; and the encoder is configured to extract the content features of the training content image and generate a content feature map having the content features, and configured to extract style features of the training style image and generate a style feature map having the style features.

Optionally, the encoder comprises a first convolutional neural sub-network; the decoder comprises a mirror network of the first convolutional neural sub-network; and the AdaIN layer is configured to perform an instance normalization on the content feature map, perform an affine transformation based on the style feature map, thereby transforming the content feature map to a normalized AdaIN feature map; wherein the first convolutional neural sub-network comprises a first convolutional layer having 64 number of kernels with a kernel size of 3*3; a second convolutional layer having 64 number of kernels with the kernel size of 3*3; a first pooling layer; a third convolutional layer having 128 number of kernels with the kernel size of 3*3; a fourth convolutional layer having 128 number of kernels with the kernel size of 3*3; a second pooling layer; a fifth convolutional layer having 256 number of kernels with the kernel size of 3*3; a sixth convolutional layer having 256 number of kernels with the kernel size of 3*3; a seventh convolutional layer having 256 number of kernels with the kernel size of 3*3; a third pooling layer; an eighth convolutional layer having 512 number of kernels with the kernel size of 3*3; a ninth convolutional layer having 512 number of kernels with the kernel size of 3*3; a tenth convolutional layer having 512 number of kernels with the kernel size of 3*3; a fourth pooling layer; an eleventh convolutional layer having 512 number of kernels with the kernel size of 3*3; a twelfth convolutional layer having 512 number of kernels with the kernel size of 3*3; a thirteenth convolutional layer having 512 number of kernels with the kernel size of 3*3; a fifth pooling layer; a first fully connected layer; a second fully connected layer; a third fully connected layer; and a Softmax layer, sequentially connected.

Optionally, the content loss is a normalized Euclidean distance between the content feature map and the normalized AdaIN feature map generated by the AdaIN layer.

Optionally, the computer-implemented method further comprises reiterating training the convolutional neural network using a different training content image or a different training style image.

In another aspect, the present invention provides a convolutional neural network configured to morph content features of an input image with style features of a style image, trained by the method described herein.

In another aspect, the present invention provides a computer-implemented method using the convolutional neural network described herein, comprising inputting an input image and a style image in the convolutional neural network; and obtaining an output image by morphing content features of an input image with style features of a style image using the convolutional neural network.

Optionally, the computer-implemented method using the convolutional neural network described herein further comprises pre-processing one or both of the input image and the style image so that the input image and the style image are of a same scale.

Optionally, the pre-processing comprises cropping or filling.

In another aspect, the present invention provides an apparatus for training a convolutional neural network configured to morph content features of an input image with style features of a style image, comprising a memory; one or more processors; and wherein the memory and the one or more processors are connected with each other; and the memory stores computer-executable instructions for controlling the one or more processors to select a training style image; extract style features of the training style image; select a training content image; extract content features of the training content image; process the training content image through the convolutional neural network to generate a training output image comprising the content features of the training content image morphed with the style features of the training style image; extract content features and style features of the training output image; compute a total loss; and tune the convolutional neural network based on the total loss comprising a content loss, a style loss, and a regularization loss.

Optionally, tuning the convolutional neural network comprises tuning the convolutional neural network in part based on the regularization loss function generated using (1) a first equation $L_m = \Sigma_{C=1}^{3} V_C[O]^T L V_C[O]$, and (2) a first matrix obtained using a second equation $$L_{(i,j)} = \Sigma_{k|(i,j)\in W_k} W_k \left( \delta_{ij} - \frac{1}{|W_k|}\left(1 + \frac{1}{\frac{\varepsilon}{|W_k|} + \sigma_k^2}(I_i - \mu_k)(I_j - \mu_k)^T\right)\right);$$

wherein a matrix dimension of the first matrix is N×N, N is a total number of pixels of the training content image; wherein L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; $\varepsilon$ is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector $I_j$; and each element of $\mu_k$ is an average value of elements in the window of pixels $W_k$; wherein $L_m$ represents the regularization loss function; C represents a sequential number of channels of the training content image; O is a pixel matrix representing the training output image; $V_C[O]$ represent a vectorized version of the training output image O in a C-th channel.

Optionally, tuning the convolutional neural network comprises tuning the convolutional neural network based on a weighted sum of the content loss, the style loss, and the regularization loss.

Optionally, a ratio of a weight of the content loss, a weight of the style loss, and a weight of the regularization loss is in a range of 1:1:0.1 to 2:1:0.1.

Optionally, tuning the convolutional neural network comprises tuning the convolutional neural network in part based on the content loss obtained using a third equation as follows:

$$L_{content} = \frac{1}{2C_e} \Sigma_{ij}(F_{ij}^e - P_{ij}^e)^2;$$

wherein $L_{content}$ represents the content loss function; e represents a sequential number of a convolutional layer in the convolutional neural network; $C_e$ represents a constant for normalizing a content loss value; $P_{ij}^e$ represents a value of a j-th position in an i-th channel of a content feature map output by an e-th convolutional layer using an i-th kernel, when the training content image is input into the e-th convolutional layer; $F_{ij}^e$ represents a value of a j-th position in an i-th channel of an output feature map output by the e-th convolutional layer using the i-th kernel, when the training output image is input into the e-th convolutional layer.

Optionally, the convolutional neural network comprises an encoder, an adaptive instance normalization layer (AdaIN layer), and a decoder, sequentially connected; the encoder is configured to extract the content features of the training content image and generate a content feature map having the content features, and configured to extract style features of the training style image and generate a style feature map having the style features.

In another aspect, the present invention provides a computer-program product, for training a convolutional neural network configured to morph content features of an input image with style features of a style image, comprising a non-transitory tangible computer-readable medium having computer-readable instructions thereon, the computer-readable instructions being executable by a processor to cause the processor to perform selecting a training style image; extracting style features of the training style image; selecting a training content image; extracting content features of the training content image; processing the training content image through the convolutional neural network to generate a training output image comprising the content features of the training content image morphed with the style features of the training style image; extracting content features and style features of the training output image; computing a total loss; and tuning the convolutional neural network based on the total loss comprising a content loss, a style loss, and a regularization loss.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Although deep learning network is introduced to morph content features of an image with style features of a reference style image and output a style-morphed image, some details of the style-morphed image, such as edges in the style-morphed image, are not changed perfectly, and the result of the style morphing process is not good enough.

Accordingly, the present disclosure provides, inter cilia, a computer-implemented method of training a convolutional neural network, a convolutional neural network, a computer-implemented method using the convolutional neural network, an apparatus for training a convolutional neural network, and a computer-program product that substantially obviate one or more of the problems due to limitations and disadvantages of the related art. In one aspect, the present disclosure provides a computer-implemented method of training a convolutional neural network configured to morph content features of an input image with style features of a style image. In some embodiments, the computer-implemented method includes selecting a training style image; extracting style features of the training style image; selecting a training content image; extracting content features of the training content image; processing the training content image through the convolutional neural network to generate a training output image including the content features of the training content image morphed with the style features of the training style image; extracting content features and style features of the training output image; computing a total loss; and tuning the convolutional neural network based on the total loss including a content loss, a style loss, and a regularization loss.

Figure 1A:
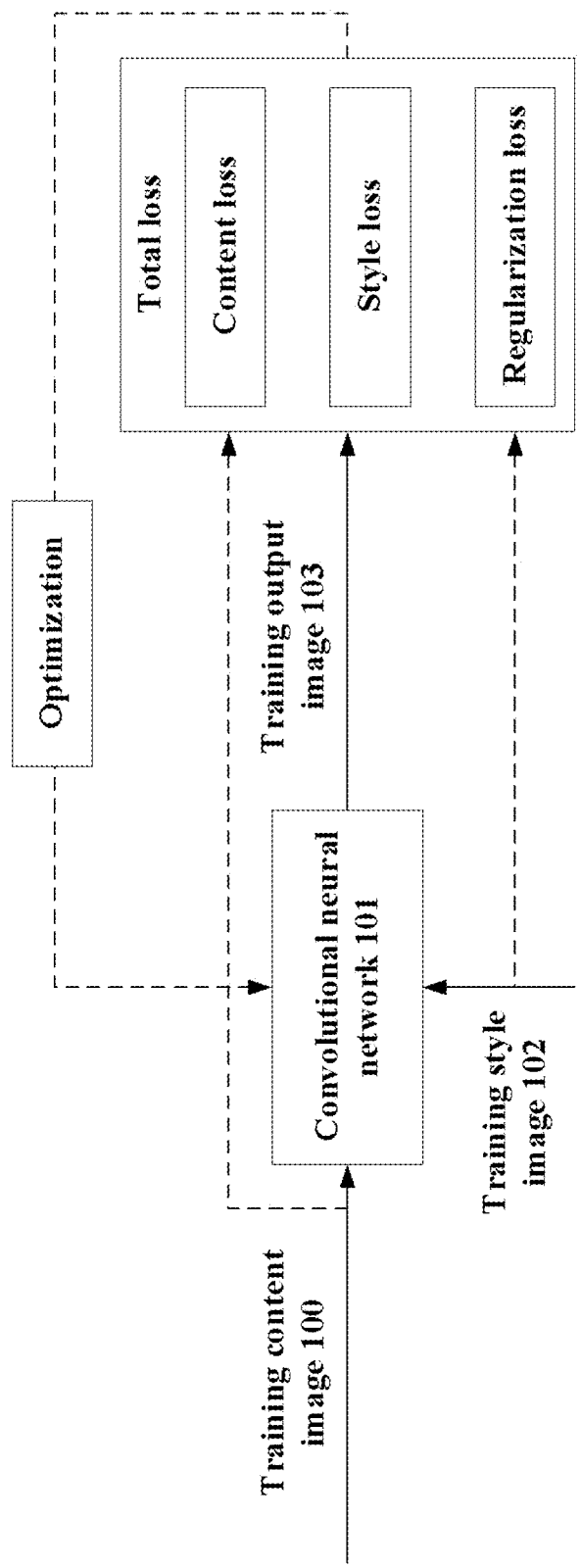
FIG. 1A is a schematic diagram illustrating a computer-implemented method of training a convolutional neural network in some embodiments according to the present disclosure.

FIG. 1A is a schematic diagram illustrating a computer-implemented method of training a convolutional neural network in some embodiments according to the present disclosure. Referring to FIG. 1A, in some embodiments, solid lines show a process of morphing content features of a training content image with style features of a training style image using a convolutional neural network 101. Dotted lines show a process of tuning the convolutional neural network 101 based on a total loss including a content loss, a style loss, and a regularization loss. For example, the turning process is the process of optimize parameters in the convolutional neural network 101. Optionally, the method of training the convolutional neural network 101 can be performed offline. Optionally, subsequent to training the convolutional neural network 101, the convolutional neural network 101 can be used to morph content features of an input image with style features of a style image.

Figure 1B:
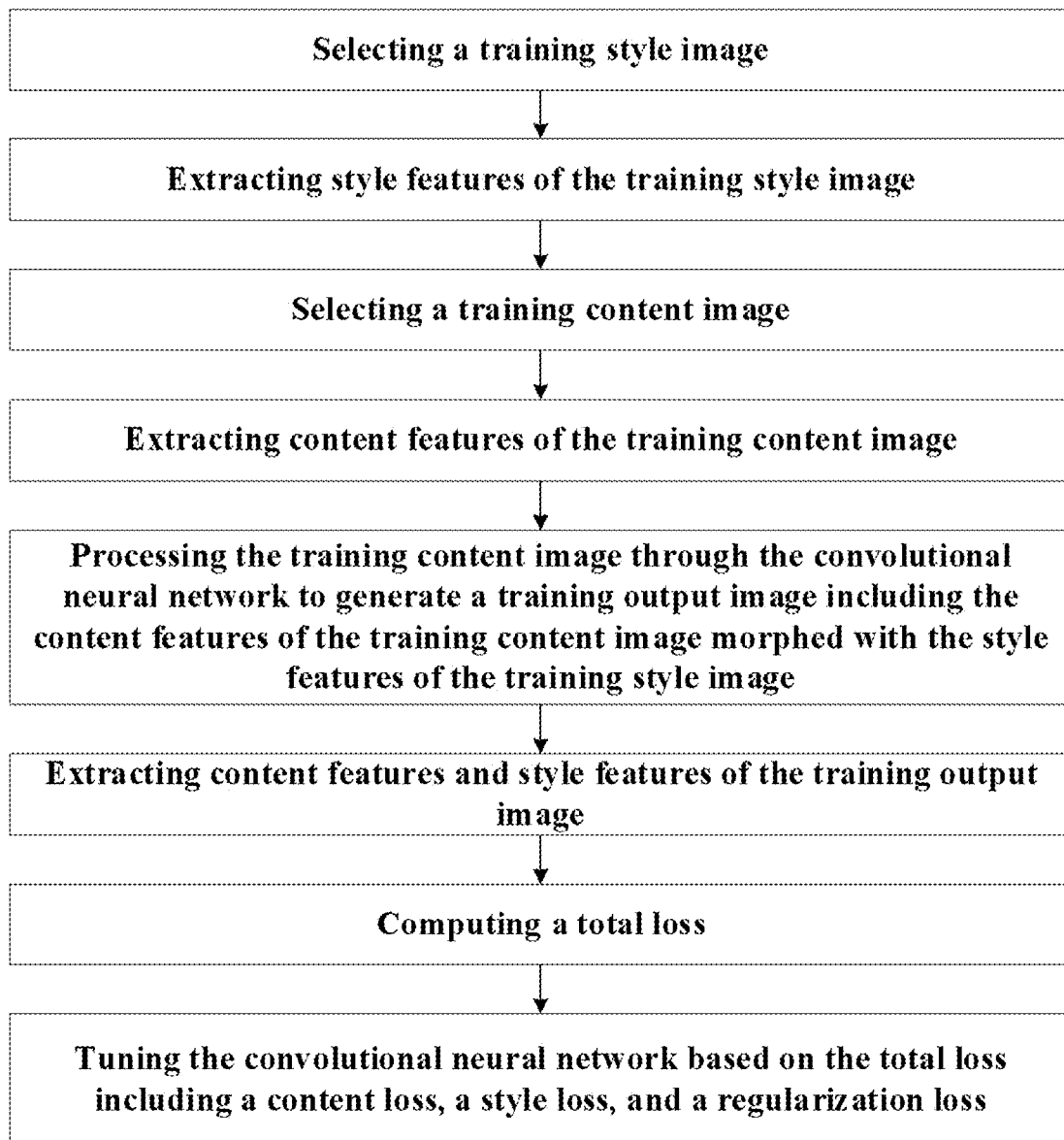
FIG. 1B is a flow chart illustrating a computer-implemented method of training a convolutional neural network in some embodiments according to the present disclosure.

FIG. 1B is a flow chart illustrating a computer-implemented method of training a convolutional neural network in some embodiments according to the present disclosure. Referring to FIG. 1B, in some embodiments, the computer-implemented method includes selecting a training style image; extracting style features of the training style image; selecting a training content image; extracting content features of the training content image; processing the training content image through the convolutional neural network to generate a training output image including the content features of the training content image morphed with the style features of the training style image; extracting content features and style features of the training output image; computing a total loss; and tuning the convolutional neural network based on the total loss including a content loss, a style loss, and a regularization loss.

Optionally, tuning the convolutional neural network includes tuning the convolutional neural network based on a weighted sum of the content loss, the style loss, and the regularization loss. Optionally, a ratio of a weight of the content loss, a weight of the style loss, and a weight of the regularization loss is in a range of 1:1:0.1 to 2:1:0.1.

In some embodiments, referring to FIG. 1A, the computer-implemented method includes inputting a training content image 100 and a training style image 102 into the convolutional neural network 101. For example, the training content image 100 is an original image configured to be morphed with a selected style. A style of the training style image 102 is the selected style used to morph the training content image 100.

Optionally, the training content image 100 and the training style image 102 has a same scale. For example, the convolutional neural network 101 requests a requested scale. Optionally, a pre-processing is performed on the training content image 100 and the training style image 102 to rescale the training content image 100 and the training style image 102 to fit in a requested scale.

As used herein, the term "scale" refers to one or any combinations of three dimensions of an image, including one or any combinations of a width of the image, a height of the image, and a depth of the image. In one example, the scale of an image (e.g., a feature map, a data, a signal) refers to a "volume" of an image, which includes the width of the image, the height of the image, and the depth of the image. In another example, spatial scale of an image (e.g., a feature map, a data, a signal) refers to a width and length of the image, e.g., width length.

Optionally, subsequent to train the convolutional neural network 101, the convolutional neural network 101 can process images having a same scale as the training content image 100 or the training style image 102. For example, an input image and a style image input in the convolutional neural network 101 have a same scale as the training content image 100 or the training style image 102. Optionally, one or both of the input image and the style image are pre-processed, so that the input image and the style image are of a same requested scale.

Various appropriate methods may be used for pre-processing an image. Examples of methods suitable for pre-processing the image include, but are not limited to, cropping or filling. In one example, filling includes resizing an image to fill a requested scale while preserving the original aspect ratio and without discarding any original image data, e.g., performing zero padding. Excessive space is filled with a solid color or blurred version of the image. In another example, cropping includes resizing an image to fill a requested scale and cropping any excess image data. The cropped image matches the requested scale without distorting the image.

Optionally, when the scale of the training style image 102 or the scale of the style image is smaller than the requested scale of the convolutional neural network 101, simply padding zero on the training style image 102 or the style image may affect the style of the training style image 102 or the scale of the style image, which should be avoided. So, it is better to rescale the training style image 102 or the style image using inpainting including structural inpainting, textural inpainting, and combined structural and textural inpainting. In painting can rescale an image and keep the original structure and texture of the image, so, the style of the training style image 102 or the scale of the style image can be kept. For example, the inpainting process can be performed using gradient vector which matches edges of the training style image 102 or the style image.

In some embodiments, in the training process, the convolutional neural network 101 is trained based on the total loss including the content loss, the style loss, and the regularization loss. As used herein, the term "regularization loss" refers to a measurement of image distortion between two related images. By adding the regularization loss as an element of the total loss in the training process, a penalty about image distortion is added to the total loss. The penalty about image distortion ensures that properties of the training content image will not be lost, and edges of the training content image are kept, which can greatly prevent image distortion.

In some embodiments, the convolutional neural network 101 is a special neural network, a pixel matrix of an image can be input into the convolutional neural network 101, and the convolutional neural network 101 can also output a pixel matrix of an output image. The convolutional neural network has a plurality of kernels function as weights and replacing weighs.

Figure 2:
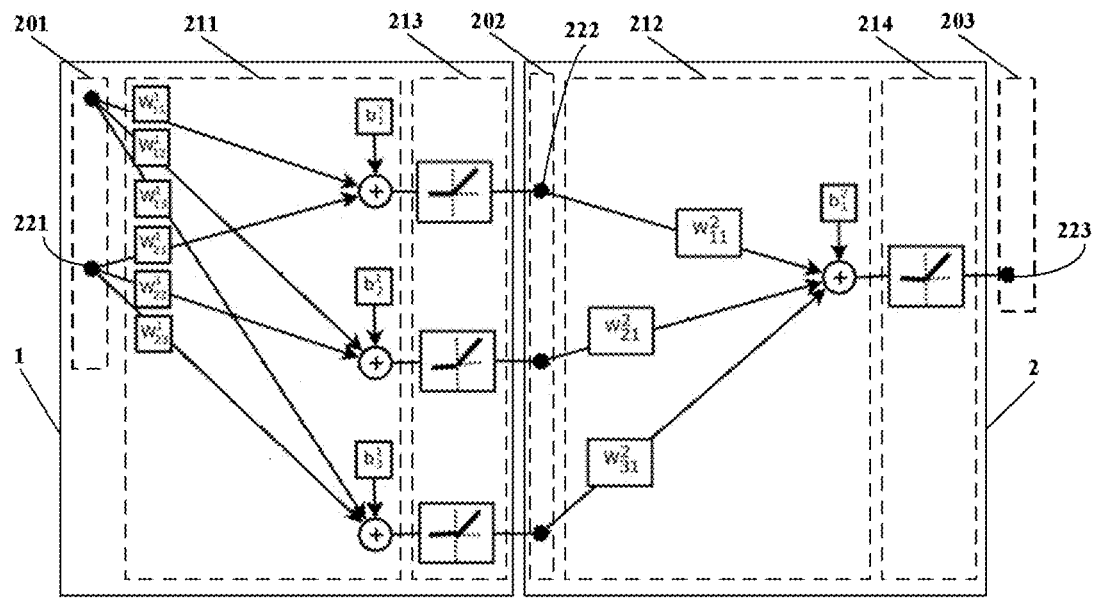
FIG. 2 is a schematic diagram illustrating a structure of a neural network configured to morph content features of an input image with style features of a style image in some embodiments according to the present disclosure.

FIG. 2 is a schematic diagram illustrating a structure of a neural network configured to morph content features of an input image with style features of a style image in some embodiments according to the present disclosure. Referring to FIG. 2, in some embodiments, the convolutional neural network includes a three-layer structure. Optionally, the convolutional neural network allows two inputs. In the training process, the first input is the training content image, the second input is the training style image. In the processing of using the convolutional neural network to morph content features of an input image with style features of a style image (hereinafter referred to as "style morphing process"), the first input is the input image, the second input is the style image. Optionally, the convolutional neural network outputs one output. In the training process, the output of the convolutional neural network is a training output image obtained by morphing content features of the training content image with style features of the training style image. In the morphing process, the output of the convolutional neural network is an output image obtained by morphing content features of the input image with style features of the style image.

In some embodiments, the convolutional neural network includes two convolutional sub-networks sequentially connected, optionally, the two convolutional sub-networks are cascaded layers. Optionally, at least one of the two convolutional sub-networks includes an input layer, a convolutional layer, an active layer, and a pooling layer.

Referring to FIG. 2, in some embodiments, the convolutional neural network includes a first convolutional sub-network 1, and a second convolutional sub-network 2. The first convolutional sub-network 1 includes a first input layer 201, a first convolutional layer 211, and a first active layer 213. The second convolutional sub-network 2 includes a second input layer 202, a second convolutional layer 212, and a second active layer 214. Optionally, the first convolutional layer 211 and the second convolutional layer 212 both has weights $w_{ij}^k$ and biases $b_i^k$. Weights $w_{ij}^k$ represent kernels. Biases $b_i^k$ are scalars added to outputs of convolutional layers. k represents a k-th input layer of the convolutional neural network. i represents a i-th input of a plurality of input in a respective one of the input layer. j represents a j-th output obtained by processing a respective one of the plurality of input. k, i j are positive integers. For example, the first convolutional layer 211 includes a first group of kernels (e.g., $w_{ij}^1$), and a first group of biases (e.g., $b_i^1$). The second convolutional layer 212 includes a second group of kernels (e.g., $w_{ij}^2$), and a second group of biases (e.g., $b_i^2$).

Optionally, referring to FIG. 2, the first active layer 213 is between the first convolutional layer 211 and the second convolutional layer 212. Optionally, at least one of the first active layer 213 and the second active layer 214 includes an activation function. The activation function are used to add non-linear elements to the convolutional neural network, so that the convolutional neural network can effectively solve a relatively complicated problem.

For example, two inputs 221 are input in the first input layer 201. Three outputs 222 are output from the first convolutional sub-network 1. The three outputs 222 are input into the second input layer 202. One output 223 is output from the second convolutional sub-network 2. So, two images (e.g., the two input 221) can be input into the convolutional neural network, and the convolutional neural network will output one image (e.g., the one output 223).

Optionally, each convolutional layer include hundreds of kernels. Optionally, a convolutional neural network includes more than five convolutional layers. When the convolutional neural network includes five to eight convolutional layers, the convolutional neural network can have a better performance in training speed, computing speed, and style morphing.

As used herein, the term "neural network" refers to a network used for solving artificial intelligence (AI) problems. A neural network includes a plurality of hidden layers. A respective one of the plurality of hidden layers includes a plurality of neurons (e.g. nodes). A plurality of neurons in a respective one of the plurality of hidden layers are connected with a plurality of neurons in an adjacent one of the plurality of hidden layers. Connects between neurons have different weights. The neural network has a structure mimics a structure of a biological neural network. The neural network can solve problems using a non-deterministic manner.

Parameters of the neural network can be tuned by pre-training, for example, a large amount of problems are input in the neural network, and results are obtained from the neural network. Feedbacks on these results is fed back into the neural network to allow the neural network to tune the parameters of the neural network. The pre-training allows the neural network to have a stronger problem-solving ability.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a scale of an input image to a scale corresponding to a certain convolutional layer. The output from the up-sampling layer or the down-sampling layer can then be processed by a convolutional layer of a corresponding scale. This enables the convolutional layer to add or extract a feature having a scale different from that of the input image.

By pre-training, parameters include, but are not limited to, a convolutional kernel, a bias, and a weight of a convolutional layer of a convolutional neural network can be tuned. Accordingly, the convolutional neural network can be used in various applications such as image recognition, image feature extraction, and image feature addition.

As used herein, the term "convolution" refers to a process of processing an image. A kernel is used for a convolution. For, each pixel of an input image has a value, a convolution kernel starts at one pixel of the input image and moves over each pixel in an input image sequentially. At each position of the kernel, the kernel overlaps a few pixels on the image based on the size (width length) of the convolution kernel. At a position of the kernel, a value of one of the few overlapped pixels is multiplied by a respective one value of the kernel to obtain a multiplied value of one of the few overlapped pixels. Subsequently, all multiplied values of the overlapped pixels are added to obtain a sum corresponding to the position of the kernel on the input image. By moving the kernel over each pixel of the input image, all the sums corresponding to all the position of the kernel are collected and output to form an output image. In one example, a convolution may extract different features of the input image using different convolution kernels. In another example, a convolution process may add more features to the input image using different convolution kernels.

As used herein, the term "convolutional layer" refers to a layer in a convolutional neural network. The convolutional layer is used to perform convolution on an input image to obtain an output image or an output feature map. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are input in a convolutional layer, a respective kernel is used to perform a convolution on a respective image of the multiple images. Optionally, different convolution kernels are used according to different situations of the input image.

As used herein, the term "convolutional kernel", also called "kernel", refers to a two-dimensional matrix used in a convolution process. Optionally, a respective one of a plurality elements in the two-dimensional matrix has a certain value.

As used herein, the term "down-sampling" refers to a process of extracting features of an input image, and outputting an output image with a smaller scale.

As used herein, the term "pooling" refers to a type of down-sampling. Various methods may be used for pooling. Examples of methods suitable for pooling includes, but are not limited to, max-pooling, avg-polling, decimation, and demuxout.

As used herein, the term "up-sampling" refers to a process of adding more information to an input image, and outputting an outputting image with a larger scale.

As used herein, the term "active layer" refers to a layer in a convolutional neural network. An active layer can perform a non-linear mapping on an output signal output from a convolutional layer. Various functions may be used in an active layer. Examples of functions suitable for being adopted in an active layer include, but are not limited to, a rectified linear units (ReLU) function, a sigmoid function, and a hyperbolic tangent function (e.g. a tan h function). In one example, an active layer is not included in a convolutional layer. In another example, a convolutional layer includes an active layer. For example, the first convolutional layer 211 includes the first active layer 213. The second convolutional layer 212 includes the second active layer 214.

In some embodiments, in the first convolutional layer 211, the first group of kernels $W_{ij}^1$ and the first group of biases $b_i^1$ are applied to a respective one of the two input 221 to generate a plurality of outputs from the first convolutional layer 211. The plurality of outputs from the first convolutional layer 211 are processed by the first active layer 213 to generate a plurality of outputs from the first active layer 213.

In some embodiments, in the second convolutional layer 212, the second groups of kernels $w_{ij}^2$ and the second group of biases $b_i^2$ are applied to a respective one of the plurality of outputs from the first active layer 213 to generate a plurality of outputs from the second convolutional layer 212. The plurality of outputs from the second convolutional layer 212 are processed by the second active layer 214 to generate a plurality of outputs from the second active layer 214.

In one example, generating a respective one of the plurality of outputs from the first convolutional layer 211 includes applying a respective one of the first group of kernels $w_{ij}^1$ to a respective one of the inputs 221 to generate an first intermediate output, and adding a respective one of the first group of biases $b_i^1$ to the intermediate output to generate the respective one of the plurality of outputs from the first convolutional layer 211.

In another example, generating a respective one of the plurality of outputs from the second convolutional layer 212 includes applying a respective one of the second group of kernels $w_{ij}^2$ to a respective one of the plurality of outputs from the first convolutional layer 211 to generate a second intermediate output, and adding a respective one of the second group of biases $b_i^2$ to the second intermediate output to generate the respective one of the plurality of outputs from the second convolutional layer 212.

For example, outputs from the first active layer 213 is the three outputs 222. Outputs from the second active layer 214 is the one output 223.

In some embodiments, a convolutional layer is a core layer of a convolutional neural network. In a convolutional layer, a neuron is connected with some of neurons in a direct adjacent convolutional layer. Optionally, a convolutional layer applies a plurality of kernels to an input image to extract a plurality of features from the input image. Optionally, a convolutional layer can extract a type of features from the input image. Optionally, an initialized kernel is a random fractional matrix. During the pre-training process of the convolutional neural network, the kernel obtains a reasonable value by learning.

Optionally, a result obtained by applying the kernel to an input image is called a feature map. The number of a plurality of feature maps is equivalent to the number of a plurality of kernels. A respective one of the plurality of feature maps corresponds to a respective one of the plurality of kernels.

Optionally, the respective one of the plurality of feature maps is formed by neurons rectangularly arranged. The neurons of the respective one of the plurality of feature maps share the respective one of the plurality of kernels.

Optionally, a convolutional neural network has a plurality of convolutional layers. A feature map output from a respective one of the plurality of convolutional layers is input into a downstream one of the plurality of convolutional layers. The downstream one of the plurality of convolutional layer processes the feature map output from the respective one of the plurality of convolutional layers and outputs a downstream feature map of the plurality of feature maps.

In some embodiments, a pooling layer is between two adjacent convolutional layers. In one example, the pooling layer is used to reduce a spatial scale (width×height) of an input image or an input feature map to simplify the computational complexity and reduce the over-fitting phenomenon. In another example, the pooling layer can compress features and extract main features of the input image or an input feature map. Optionally, the pooling layer reduces a spatial scale (width×height) of the input image or the input feature map, but does not change a total number of channels of the input image or the input feature map. For example, an input image having a spatial scale (width×height) of 12×12 is sampled by a 6×6 filter of the pooling layer, subsequently, the pooling layer outputs an output image having a spatial scale (width×height) of 2×2, which means the 144 pixels of the input image having the spatial scale (width×height) of 12×12 is divided into four portions, each portion of the four portions of the 144 pixels has 36 pixels. Subsequent to a pooling process using the 6×6 filter, the 36 pixels in each portion is combined into 1 pixel, and the output image generated has a spatial scale (width×height) of 2×2.

For example, an input of a convolutional layer can be an image, a feature map, and a data signal. An output of the convolutional layer is a feature map which having a volume of width×height×depth. A feature map includes a plurality of feature sub-maps. Optionally, a total number of the plurality of feature sub-maps is considered as the depth of the feature map. Optionally, a respective one of the plurality of feature sub-maps corresponds to a respective channel of a plurality of channels of the feature map, so, the total number of the plurality of feature sub-maps of the feature map corresponds to a total number of channels of the feature map. Optionally, a spatial scale of a feature map refers to a width×height of the feature map. A spatial scale of the respective one of the plurality of feature sub-maps is a width×height of the respective one of the plurality of feature sub-maps of the feature map. Each of the feature sub-map of the feature map has a same spatial scale as the spatial scale of the feature map. Optionally, the convolutional layer has a plurality of kernels. A respective one of the plurality of kernels performs a convolutional process on the input of the convolutional layer and generates a respective one of the plurality of feature sub-maps output by the convolutional layer. A total number of the kernels in the convolutional layer corresponds to the total number of feature sub-maps of the feature map output from the convolutional layer.

As used herein, the term "pooling" refers to a type of down-sampling. Various methods may be used for pooling. Examples of methods suitable for pooling includes, but are not limited to, max-pooling, avg-polling, decimation, and demuxout. As used herein, the term "down-sampling" refers to a process of extracting features of an input image, and outputting an output image with a smaller scale.

In some embodiments, the convolutional neural network further includes a normalization layer. As used herein, the term "normalization layer" refers to a layer in a convolutional neural network used to normalize a feature map output from a convolutional layer. Various appropriate functions may be adopted by a normalization layer. Examples of functions suitable to be used in a normalization layer include, but are not limited to, instance normalization and batch normalization. By performing a normalization on the output of the convolutional neural network, the normalized output is closer to the independently identically distribution, which may make the training process more stable and has a fast convergence.

In one example, the batch normalization normalizes a feature map based on a mean and a variance of elements in the feature map. For example, a size of a mini-batch is T, and a number of channels of the feature map output from a convolutional layer is C. A respective one of channels of the feature map (e.g., a feature sub-map) is a matrix having H rows and W columns (e.g., a spatial scale of the feature map is H*W). A shape of the feature maps output from the convolutional layer is represented by (T, C, W, H). The normalization formula of batch normalization is as follows:

$$y_{tijk} = \frac{x_{tijk} - \mu_i}{\sqrt{\sigma_i^2 + \varepsilon}};$$

$$\mu_i = \frac{1}{THW}\sum_{t=1}^{T}\sum_{l=1}^{W}\sum_{m=1}^{H} x_{tilm};$$

$$\sigma_i^2 = \frac{1}{THW}\sum_{t=1}^{T}\sum_{l=1}^{W}\sum_{m=1}^{H} (x_{tilm}-m\mu_i)^2;$$

Wherein $x_{tijk}$ is a value of an element in a j-th column and a k-th row of a t-th patch on an i-th channel of the feature map; μi represents a mean of the elements in the i-th channel of the feature map. $\sigma_i^2$ represents a variation of the elements in the i-th channel of the feature map. $y_{tijk}$ represents a result obtained by inputting $x_{tijk}$ into the formula of batch normalization. ε is a very small positive number for preventing the denominator from being zero.

In another example, the normalization formula of instance normalization is as follows:

$$y_{tijk} = \frac{x_{tijk}-\mu_{ti}}{\sqrt{\sigma_{ti}^2+\varepsilon}};$$

$$\mu_{ti} = \frac{1}{HW}\sum_{t=1}^{T}\sum_{l=1}^{W}\sum_{m=1}^{H} x_{tilm};$$

$$\sigma_{ti}^2 = \frac{1}{HW}\sum_{l=1}^{W}\sum_{m=1}^{H} (x_{tilm}-m\mu_{ti})^2;$$

Wherein $x_{tijk}$ is a value of an element in a j-th column and a k-th row of a t-th patch on an i-th channel of the feature map; $\mu_{ti}$ represents a mean of the elements in the t-th patch on the i-th channel of the feature map. $\sigma_i^2$ represents a variation of the elements in the t-th patch on the i-th channel of the feature map. $y_{tijk}$ represents a result obtained by inputting $x_{tijk}$ into the formula of instance normalization. ε is a very small positive number for preventing the denominator from being zero.

In some embodiments, referring to FIG. 1A and FIG. 2, the computer-implemented method of training the convolutional neural network includes feeding a training database having a plurality of groups of training images to a total loss function to calculate a total loss. Optionally, a respective one of the plurality of groups of training images includes a training content image and a training style image.

Various appropriate optimizations may be used in training the convolutional neural network. Examples of optimizations suitable for training the convolutional neural network include, but are not limited to, gradient descent, and newton's method. The optimizations are configured to optimize or tune parameters in the convolutional neural network so that the total loss of the convolutional neural network reaches a minimum value.

Subsequent to training the convolutional neural network, parameters including kernels and biases of the convolutional neural network are determined.

Optionally, the convolutional neural network can be trained offline. Optionally, subsequent to obtaining an updated training database, the convolutional neural network can be trained again using the updated training database. Offline training may provide a plenty of time for training the convolutional neural network, and the updated training database can provide rich data, so, the convolutional neural networking trained using a rich database and a plenty of time can provide a better morphing result.

In some embodiments, the computer-implemented method of training the convolutional neural network further includes tuning the convolutional neural network in part based on the regularization loss function generated using:

(1) a first equation $L_m = \Sigma_{C=1}^{3} V_C[O]^T L V_C[O]$, and (2) a first matrix obtained using a second equation $$L_{(i,j)} = \Sigma_{k|(i,j)\in W_k}\left(\delta_{ij} - \frac{1}{|W_k|}\left(1 + \frac{1}{\frac{\varepsilon}{|W_k|}+\sigma_k^2}(I_i-\mu_k)(I_j-\mu_k)^T\right)\right).$$

wherein, a matrix dimension of the first matrix $L_{(i,j)}$ is N×N, N is a total number of pixels of the training content image; wherein L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; ε is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector $I_j$; and each element of $\mu_k$ is an average value of elements in the window of pixels $W_k$; wherein $L_m$ represents the regularization loss function; C represents a sequential number of channels of the training content image; (e.g., C=1 represents a channel of red color; C=2 represents a channel of green color; C=3 represents a channel of blue color); O is a pixel matrix representing the training output image; $V_C[O]$ represent a vectorized version of the training output image O in a C-th channel.

Optionally, the first matrix $L_{(i,j)}$ is obtained using the second equation. Optionally, $L_m$ is obtained using the first matrix $L_{(i,j)}$.

For example, in order to find an affine transform which is a locally affine in color space (e.g., find an affine function that can maps the input RGB values onto their output counterparts of each output patch, each input patch may have a different affine function, which allows for spatial variations.), edge patch can be considered. Although the affine combinations of the RGB channels could generate a group of variations, the edge cannot move because it is located at the same place in all channels. By applying the first matrix $L_{(i,j)}$ to pixel matrixes of channels of a feature map, a penalty of image distortion is obtained, if a value of the penalty is higher, the image distortion is greater.

The first equation is an example of obtaining a regularization penalty by applying L to pixel values of each channel of the three color channels of an image. Optionally, other equations may be used for obtaining a regularization penalty. Optionally, a pre-processing is performed on the output image or training output image prior to use the first equation. The pre-processing includes removing noise and/or removing background. Optionally, a normalization is performed on the result of $L_m$ to prevent image distortion caused by difference pixel value ranges of different images.

As used herein, the term "content loss" refers to a definition used to evaluate the similarity between a content of one image and a content of another image. A convolutional neural network can separately extract content features from a training content image and a training output image.

For example, an e-th convolutional layer of the convolutional neural network includes a plurality of kernels. A total number of the plurality of kernel is I. A feature map, output from the e-th convolutional layer having I numbers of kernels, has I number of channels (e.g., the feature map includes I number of feature sub-maps which are two dimensional maps). A spatial scale (width×height) of the feature map is J. Therefore, the feature map output by the e-th convolutional layer is stored in a matrix $F^e \in R^{I \times J}$. $F_{ij}^e$ represents a value of a j-th position in an i-th channel of the feature map output by the e-th convolutional layer using an i-th kernel.

For example, subsequent to inputting the training content image into the e-th convolutional layer of the convolutional neural network, a content feature map $P^e$ is output. Subsequent to inputting the training output image into the e-th convolutional layer of the convolutional neural network, the output feature map $F^e$ is output. A content loss between the training content image and the training output image is defined using the following equation:

$$L_{content} = \frac{1}{2C_e} \Sigma_{ij} (F_{ij}^e - P_{ij}^e)^2;$$

wherein $L_{content}$ represents the content loss function; e represents a sequential number of a convolutional layer in the convolutional neural network; $C_e$ represents is a constant for normalizing a content loss value; $P_{ij}^e$ represents a value of a j-th position in an i-th channel of a content feature map output by the e-th convolutional layer using an i-th kernel, when the training content image is input into the e-th convolutional layer; $F_{ij}^e$ represents a value of a j-th position in an i-th channel of an output feature map output by the e-th convolutional layer using an i-th kernel, when the training output image is input into the e-th convolutional layer.

Figure 3:
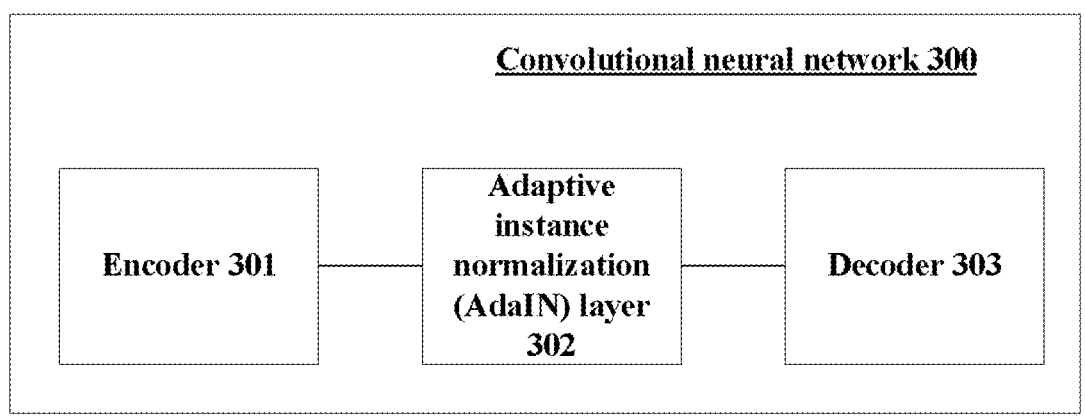
FIG. 3 is a schematic diagram illustrating a structure of a neural network configured to morph content features of an input image with style features of a style image in some embodiments according to the present disclosure.

FIG. 3 is a schematic diagram illustrating a structure of a neural network configured to morph content features of an input image with style features of a style image in some embodiments according to the present disclosure. Referring to FIG. 3, in some embodiments, the convolutional neural network 300 includes a decoder 303, an adaptive instance normalization (AdaIN) layer 302, and a decoder 303, sequentially connected. Optionally, the encoder 301 is configured to extract the content features of the training content image and generate a content feature map having the content features, and configured to extract style features of the training style image and generate a style feature map having the style features.

As used herein, the term "adaptive instance normalization (AdaIN)" is a type of normalization. For example, AdaIN receives a content input x and a style input y, and aligns the channel-wise mean and variance of x to match those of y. AdaIN has no learnable affine parameters. AdaIN adaptively computes the affine parameters from the style input.

Optionally, the content loss is a normalized Euclidean distance between the content feature map and the AdaIN feature map generated by the AdaIN layer 302. For example, the content feature map is obtained from the encoder 301. The AdaIN feature map is obtained from the AdaIN layer 302 by inputting the content feature map and the style feature map into the AdaIN layer 302.

Optionally, the encoder 301 includes a first convolutional neural sub-network. Optionally, a depth of the first convolutional neural sub-network is 16, e.g., a total number of layers in the first convolutional neural sub-network is 16.

Optionally, when an input image is an RGB image (having 3 channels), the first convolutional neural sub-network includes a first convolutional layer having 64 number of kernels with a kernel size of 3*3; a second convolutional layer having 64 number of kernels with the kernel size of 3*3; a first pooling layer (e.g., a maxing pooling layer); a third convolutional layer having 128 number of kernels with the kernel size of 3*3; a fourth convolutional layer having 128 number of kernels with the kernel size of 3*3; a second pooling layer (e.g., a maxi pooling layer); a fifth convolutional layer having 256 number of kernels with the kernel size of 3*3; a sixth convolutional layer having 256 number of kernels with the kernel size of 3*3; a seventh convolutional layer having 256 number of kernels with the kernel size of 3*3; a third pooling layer (e.g., a maxi pooling layer); an eighth convolutional layer having 512 number of kernels with the kernel size of 3*3; a ninth convolutional layer having 512 number of kernels with the kernel size of 3*3; a tenth convolutional layer having 512 number of kernels with the kernel size of 3*3; a fourth pooling layer (e.g., a maxi pooling layer); an eleventh convolutional layer having 512 number of kernels with the kernel size of 3*3; a twelfth convolutional layer having 512 number of kernels with the kernel size of 3*3; a thirteenth convolutional layer having 512 number of kernels with the kernel size of 3*3; a fifth pooling layer (e.g., a maxi pooling layer); a first fully connected layer; a second fully connected layer; a third fully connected layer; and a Softmax layer, sequentially connected. Optionally, an active layer (e.g., ReLU layer) and a padding layer can be used in a respective one of the plurality of convolutional layers in the first convolutional neural sub-network. As used herein, the term "Softmax layer" refers to a layer that performs a logistic regression function which calculates the probability of the input belonging to every one of the existing classes. For example, the Softmax layer limits the scope of its calculations to a specific set of classes and output, a result in a specific range, e.g., a range from 1 to 0, for each one of the classes.

Optionally, the AdaIN layer 302 is configured to perform an instance normalization on the content feature map, and perform an affine transformation based on the style feature map, thereby transforming the content feature map to the normalized AdaIN feature map. Optionally, the AdaIN layer 302 has a style strength parameters which is configured to input a style strength of the training output image between the training content image whose style strength is 0 and the training style image whose style strength is 1.

Optionally, the decoder 303 includes a mirror network of the first convolutional neural sub-network. For example, in order to match the AdaIN layer 302, the encoder 301 is the first convolutional neural sub-network described herein, and the decoder 303 is the mirror network of the first convolutional neural sub-network. Optionally, due to the deterministic transformations in the AdaIN layer 302 and the first convolutional neural sub-network, the decoder 303 remains to be a component in the network, that still need to learn during the training process.

Optionally, the content loss is calculated bases on a following equation:

$$L_{content} = \frac{1}{2C1} \| f(g(t)) - f(t) \|_2;$$

wherein $f(g(t))$ represents AdaIN features of the AdaIN feature map output from the AdaIN layer 302; $f(t)$ represents content features of the content feature map output from the encoder 301; t represents a sequential number of the training content images; C1 is a total number of the training content images.

As used herein, the term "style loss" refers to a definition used to evaluate the similarity between a style of one image and a style of another image. The convolutional neural network separately extract style features from the training style image and the training output image.

For example, subsequent to extracting style features from a training style image using a l-th convolutional layer of the convolutional neural network, the l-th convolutional layer outputs a following Gram matrix:

$$G_{ij}^l = \sum_k F_{kj}^l F_{ik}^l;$$

Given that subsequent to extracting the style features from the training style image, the l-th convolutional layer outputs a first Gram matrix $A^l$, and subsequent to extracting a style feature from the training output image, the l-th convolutional layer outputs a second Gram matrix $G^l$. A style loss between the training style image and the training output image obtained from the l-th convolutional layer is defined using the following equation:

$$E_l = \frac{1}{4N_l^2 M_l^2 C2} \Sigma_{i,j} (G_{ij}^l - A_{ij}^l)^2;$$

wherein $A^l$ represents a first Gram matrix showing a style feature map output from the l-th convolutional layer of the convolutional neural network when the training style image is input in the convolutional neural network; $G^l$ represents a second Gram matrix showing a output feature map output from the l-th convolutional layer of the convolutional neural network, when the training output image is input in the convolutional neural network; $A_{ij}^l$ represents a value of a j-th position in an i-th channel of the style feature map output by the l-th convolutional layer using an i-th kernel, when the training style image is input into the l-th convolutional layer; $G_{ij}^l$ represents a value of a j-th position in an i-th channel of the output feature map output by the l-th convolutional layer using an i-th kernel, when the training output image is input into the l-th convolutional layer; Nl represents a total number of kernel in the l-th convolutional layer of the convolutional neural network; Ml represents a spatial scale (width×height) of the feature map output from the i-th convolutional layer of the convolutional neural network. C2 is a constant used for normalizing the style loss value. For example, the Gram matrix represents an eccentric covariance matrix between channels of a feature map.

The total style losses of the convolutional neural network is defined by a following equation:

$$L_{style} = \Sigma_{l=0}^L w_l E_l;$$

Wherein $w_l$ is a weight of a style loss of l-th convolutional layer.

In some embodiments, the total loss used in tuning the convolutional neural network is a weighted sum of the content loss, the style loss, and the regularization loss, which is represented by the following equation:

$$L_{total} = \alpha L_{content} + \beta L_{style} + \gamma L_m;$$

wherein $\alpha$ is a weight of the content loss; $\beta$ is a weight of style loss; $\gamma$ is a weight of regularization loss.

Optionally, except for the content loss, the style loss, and the regularization loss, the total loss includes other losses. Optionally, the content loss, the style loss and the regularization loss is added using other methods to obtain the total loss.

Optionally, a ratio of the weight of the content loss, the weight of the style loss, and the weight of the regularization loss is in a range of 1:1:0.1 to 2:1:0.1, e.g., 1:1:0.1 to 1.2:1:0.1, 1.2:1:0.1 to 1.4:1:0.1, 1.4:1:0.1 to 1.6:1:0.1; 1.6:1:0.1 to 1.8:1:0.1, 1.8:1:0.1 to 2:1:0.1.

In some embodiments, the computer-implemented method further includes reiterating training the convolutional neural network using a different training content image or a different training style image.

Figure 4:
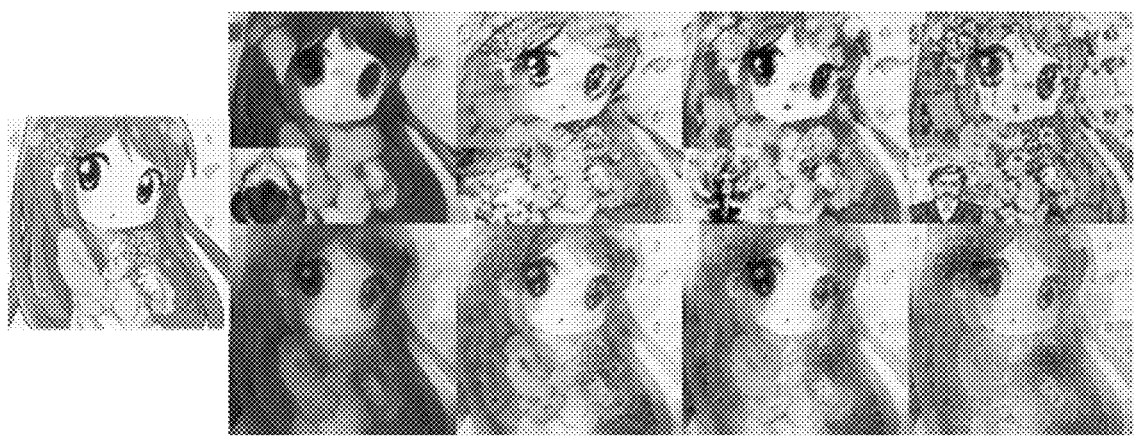
FIG. 4 is a schematic diagram of a comparison result between images morphed with styles using conventional method and image morphed with same styles using a conventional neural network trained by a computer-implemented method in some embodiments according to the present disclosure.

FIG. 4 is a schematic diagram of a comparison result between images morphed with styles using conventional method and image morphed with same styles using a conventional neural network trained by a computer-implemented method in some embodiments according to the present disclosure. In some embodiments, referring to FIG. 4, the very left image in the FIG. 4 is an input image. Images in the first row are images output from a comparing convolutional neural network trained using a loss function which only includes the content loss and the style loss. A respective one of the images in the first row is respectively morphed with a style of a style image shown in the left bottom of the respective one of the images in the first row. Images in the second row are output images output from the convolutional neural network described herein and trained using the loss function described herein which includes the content loss, the style loss, and the regularization loss. A respective one of the images in the second row is respective morphed with the style of the style image shown in the left bottom of an image above the respective one of the images in the second row. Comparing the images in the first row and the images in the second row, the edges of the input image is better kept in images in the second row, and the images in the second row have a better style morphing result.

In another example, the present disclosure also provides a convolutional neural network configured to morph content features of an input image with style features of a style image. In some embodiments, the convolutional neural network is trained by the method described herein.

In another example, the present disclosure also provides a computer-implemented method using the convolutional neural network described herein. In some embodiments, the computer-implemented method using the convolutional neural network includes inputting an input image and a style image in the convolutional neural network; and obtaining an output image by morphing content features of an input image with style features of a style image using the convolutional neural network.

Optionally, the computer-implemented method using the convolutional neural network further includes pre-processing one or both of the input image and the style image so that the input image and the style image are of a same scale. Optionally, the pre-processing includes cropping or filling.

Figure 5:
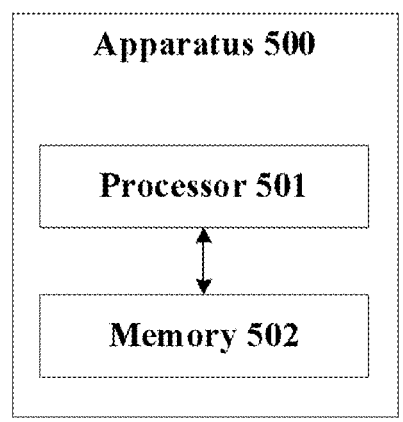
FIG. 5 is a schematic diagram of a structure of an apparatus for training a convolutional neural network configured to morph content features of an input image with style features of a style image in some embodiments according to the present disclosure.

In another aspect, the present disclosure also provides an apparatus for training a convolutional neural network configured to morph content features of an input image with style features of a style image. FIG. 5 is a schematic diagram of a structure of an apparatus for training a convolutional neural network configured to morph content features of an input image with style features of a style image in some embodiments according to the present disclosure. In some embodiments, referring to FIG. 5, the apparatus 500 includes a memory 502; and one or more processors 501. Optionally, the memory 502 and the one or more processors 501 are connected with each other. Optionally, the memory 502 stores computer-executable instructions for controlling the one or more processors to select a training style image; extract style features of the training style image; select a training content image; extract content features of the training content image; process the training content image through the convolutional neural network to generate a training output image including the content features of the training content image morphed with the style features of the training style image; extract content features and style features of the training output image; compute a total loss; and tune the convolutional neural network based on the total loss including a content loss, a style loss, and a regularization loss.

In some embodiments, tuning the convolutional neural network includes tuning the convolutional neural network in part based on the regularization loss function generated using (1) a first equation $L_m = \Sigma_{C=1}^{3} V_C[O]^T L V_C[O]$, and (2) a first matrix obtained using a second equation $$L_{(i,j)} = \Sigma_{k|(i,j) \in W_k} \left( \delta_{ij} - \frac{1}{|W_k|} \left( 1 + \frac{1}{\frac{\varepsilon}{|W_k|} + \sigma_k^2} (I_i - \mu_k)(I_j - \mu_k)^T \right) \right);$$

wherein a matrix dimension of the first matrix is N×N, N is a total number of pixels of the training content image.

wherein, L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; $\varepsilon$ is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector and each element of $\mu_k$ is an average value of elements in the window of pixels $W_k$;

wherein $L_m$ represents the regularization loss function; C represents a sequential number of channels of the training content image; O is a pixel matrix representing the training output image; $V_C[O]$ represent a vectorized version of the training output image O in a C-th channel.

In some embodiments, tuning the convolutional neural network includes tuning the convolutional neural network based on a weighted sum of the content loss, the style loss, and the regularization loss. Optionally, a ratio of a weight of the content loss, a weight of the style loss, and a weight of the regularization loss is in a range of 1:1:0.1 to 2:1:0.1.

In some embodiments, tuning the convolutional neural network includes tuning the convolutional neural network in part based on the content loss obtained using a third equation as follows:

$$L_{content} = \frac{1}{2C_e} \Sigma_{ij} (F_{ij}^e - P_{ij}^e)^2;$$

wherein $L_{content}$ represents the content loss function; e represents a sequential number of a convolutional layer in the convolutional neural network; $C_e$ represents is a constant for normalizing a content loss value; $P_{ij}^e$ represents a value of a j-th position in an i-th channel of a content feature map output by the e-th convolutional layer using an i-th kernel, when the training content image is input into the e-th convolutional layer; $F_{ij}^e$ represents a value of a j-th position in an i-th channel of an output feature map output by the e-th convolutional layer using an i-th kernel, when the training output image is input into the e-th convolutional layer.

In some embodiments, the convolutional neural network includes an encoder, an adaptive instance normalization layer (AdaIN layer), and a decoder, sequentially connected. Optionally, the encoder is configured to extract the content features of the training content image and generate a content feature map having the content features, and configured to extract style features of the training style image and generate a style feature map having the style features.

Various appropriate memory may be used in apparatus having the convolutional neural network described herein. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present virtual image display apparatus. Examples of appropriate processors include, but are not limited to, a general-purpose processor, a central processing unit (CPU), a microprocessor, a digital signal processor (DSP), a controller, a microcontroller, a state machine, etc.

In another example, the present disclosure also provides a computer-program product for training a convolutional neural network configured to morph content features of an input image with style features of a style image. Optionally, the computer-program product includes a non-transitory tangible computer-readable medium having computer-readable instructions thereon. Optionally, the computer-readable instructions are executable by a processor to cause the processor to perform selecting a training style image; extracting style features of the training style image; selecting a training content image; extracting content features of the training content image; processing the training content image through the convolutional neural network to generate a training output image including the content features of the training content image morphed with the style features of the training style image; extracting content features and style features of the training output image; computing a total loss; and tuning the convolutional neural network based on the total loss including a content loss, a style loss, and a regularization loss.

Various illustrative neural networks, encoders, layers, decoders, and other operations described in connection with the configurations disclosed herein may be implemented as electronic hardware, computer software, or combinations of both, Such neural networks, encoders, layers, decoders, and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method of training a convolutional neural network configured to morph content features of an input image with style features of a style image, comprising:
    selecting a training style image;
    extracting style features of the training style image;
    selecting a training content image;
    extracting content features of the training content image;
    processing the training content image through the convolutional neural network to generate a training output image comprising the content features of the training content image morphed with the style features of the training style image;
    extracting content features and style features of the training output image;
    computing a total loss; and
    tuning the convolutional neural network based on the total loss comprising a content loss, a style loss, and a regularization loss;
    wherein tuning the convolutional neural network comprises tuning the convolutional neural network in part based on a regularization loss function generated using (1) a first equation $L_m = \Sigma_{C=1}^{3} V_C[O]^T L V_C[O]$, and (2) a first matrix obtained using a second equation $$L_{(i,j)} = \Sigma_{k|(i,j) \in W_k} \left( \delta_{ij} - \frac{1}{|W_k|} \left( 1 + \frac{1}{\frac{\varepsilon}{|W_k|} + \sigma_k^2} (I_i - \mu_k)(I_j - \mu_k)^T \right) \right);$$

wherein a matrix dimension of the first matrix is N×N, N is a total number of pixels of the training content image;
    wherein L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; $\varepsilon$ is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector $I_j$; and each element of $\mu_k$ is an average value of elements in the window of pixels $W_k$;
    wherein $L_m$ represents the regularization loss function; C represents a sequential number of channels of the training content image; O is a pixel matrix representing the training output image; $V_C[O]$ represent a vectorized version of the training output image O in a C-th channel.

2. The computer-implemented method of claim 1, wherein tuning the convolutional neural network comprises tuning the convolutional neural network based on a weighted sum of the content loss, the style loss, and the regularization loss.

3. The computer-implemented method of claim 1, wherein a ratio of a weight of the content loss, a weight of the style loss, and a weight of the regularization loss is in a range of 1:1:0.1 to 2:1:0.1.

4. The computer-implemented method of claim 1, wherein tuning the convolutional neural network comprises tuning the convolutional neural network in part based on the content loss obtained using a third equation as follows:

$$L_{content} = \frac{1}{2C_e} \Sigma_{ij}(F_{ij}^e - P_{ij}^e)^2;$$

wherein $L_{content}$ represents a content loss function; e represents a sequential number of a convolutional layer in the convolutional neural network; $C_e$ represents a constant for normalizing a content loss value; $P_{ij}^e$ represents a value of a j-th position in an i-th channel of a content feature map output by an e-th convolutional layer using an i-th kernel, when the training content image is input into the e-th convolutional layer; $F_{ij}^e$ represents a value of a j-th position in an i-th channel of an output feature map output by the e-th convolutional layer using the i-th kernel, when the training output image is input into the e-th convolutional layer.

5. The computer-implemented method of claim 1, wherein the convolutional neural network comprises an encoder, an adaptive instance normalization (AdaIN) layer, and a decoder, sequentially connected; and
the encoder is configured to extract the content features of the training content image and generate a content feature map having the content features, and configured to extract style features of the training style image and generate a style feature map having the style features.

6. The computer-implemented method of claim 5, wherein the encoder comprises a first convolutional neural sub-network;
the decoder comprises a mirror network of the first convolutional neural sub-network; and
the AdaIN layer is configured to perform an instance normalization on the content feature map, perform an affine transformation based on the style feature map, thereby transforming the content feature map to a normalized AdaIN feature map;
wherein the first convolutional neural sub-network comprises a first convolutional layer having 64 number of kernels with a kernel size of 3*3;
a second convolutional layer having 64 number of kernels with the kernel size of 3*3;
a first pooling layer;
a third convolutional layer having 128 number of kernels with the kernel size of 3*3;
a fourth convolutional layer having 128 number of kernels with the kernel size of 3*3;
a second pooling layer;
a fifth convolutional layer having 256 number of kernels with the kernel size of 3*3;
a sixth convolutional layer having 256 number of kernels with the kernel size of 3*3;
a seventh convolutional layer having 256 number of kernels with the kernel size of 3*3;
a third pooling layer;
an eighth convolutional layer having 512 number of kernels with the kernel size of 3*3;
a ninth convolutional layer having 512 number of kernels with the kernel size of 3*3;
a tenth convolutional layer having 512 number of kernels with the kernel size of 3*3;
a fourth pooling layer;
an eleventh convolutional layer having 512 number of kernels with the kernel size of 3*3;
a twelfth convolutional layer having 512 number of kernels with the kernel size of 3*3;
a thirteenth convolutional layer having 512 number of kernels with the kernel size of 3*3;
a fifth pooling layer;
a first fully connected layer;
a second fully connected layer;
a third fully connected layer; and
a Softmax layer, sequentially connected.

7. The computer-implemented method of claim 5, wherein the content loss is a normalized Euclidean distance between the content feature map and a normalized AdaIN feature map generated by the AdaIN layer.

8. The computer-implemented method of claim 1, further comprising reiterating training the convolutional neural network using a different training content image or a different training style image.

9. A computer-implemented method comprising:
training a convolutional neural network by the method of claim 1;
inputting an input image and a style image in the convolutional neural network; and
obtaining an output image by morphing content features of an input image with style features of a style image using the convolutional neural network.

10. The computer-implemented method of claim 9, further comprising pre-processing one or both of the input image and the style image so that the input image and the style image are of a same scale.

11. The computer-implemented method of claim 10, wherein the pre-processing comprises cropping or filling.

12. An apparatus for training a convolutional neural network configured to morph content features of an input image with style features of a style image, comprising:
a memory;
one or more processors; and
wherein the memory and the one or more processors are connected with each other; and
the memory stores computer-executable instructions for controlling the one or more processors to:
select a training style image;
extract style features of the training style image;
select a training content image;
extract content features of the training content image;
process the training content image through the convolutional neural network to generate a training output image comprising the content features of the training content image morphed with the style features of the training style image;
extract content features and style features of the training output image;
compute a total loss; and
tune the convolutional neural network based on the total loss comprising a content loss, a style loss, and a regularization loss;
wherein tuning the convolutional neural network comprises tuning the convolutional neural network in part based on a regularization loss function generated using (1) a first equation $L_m = \Sigma_{C=1}^3 V_C[O]^T L V_C[O]$, and (2) a first matrix obtained using a second equation $$L_{(i,j)} = \Sigma_{k|(i,j)\in w_k}\left(\delta_{ij} - \frac{1}{|W_k|}\left(1 + \frac{1}{\frac{\varepsilon}{|W_k|} + \sigma_k^2}(I_i - \mu_k)(I_j - \mu_k)^T\right)\right);$$

wherein a matrix dimension of the first matrix is N×N, N is a total number of pixels of the training content image;

wherein L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; $\varepsilon$ is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector $I_j$; and each element of $\mu_k$ is an average value of elements in the window of pixels $W_k$;

wherein $L_m$ represents the regularization loss function; C represents a sequential number of channels of the training content image; O is a pixel matrix representing the training output image; $V_C[O]$ represent a vectorized version of the training output image O in a C-th channel.

13. The apparatus of claim 12, wherein tuning the convolutional neural network comprises tuning the convolutional neural network based on a weighted sum of the content loss, the style loss, and the regularization loss.

14. The apparatus of claim 13, wherein a ratio of a weight of the content loss, a weight of the style loss, and a weight of the regularization loss is in a range of 1:1:0.1 to 2:1:0.1.

15. The apparatus of claim 12, wherein tuning the convolutional neural network comprises tuning the convolutional neural network in part based on the content loss obtained using a third equation as follows:

$$L_{content} = \frac{1}{2C_e} \Sigma_{ij}(F_{ij}^e - P_{ij}^e)^2;$$

wherein $L_{content}$ represents a content loss function; e represents a sequential number of a convolutional layer in the convolutional neural network; $C_e$ represents is a constant for normalizing a content loss value; $P_{ij}^e$ represents a value of a j-th position in an i-th channel of a content feature map output by an e-th convolutional layer using an i-th kernel, when the training content image is input into the e-th convolutional layer; $F_{ij}^e$ represents a value of a j-th position in an i-th channel of an output feature map output by the e-th convolutional layer using an i-th kernel, when the training output image is input into the e-th convolutional layer.

16. The apparatus of claim 12, wherein the convolutional neural network comprises an encoder, an adaptive instance normalization layer (AdaIN layer), and a decoder, sequentially connected;

the encoder is configured to extract the content features of the training content image and generate a content feature map having the content features, and configured to extract style features of the training style image and generate a style feature map having the style features.

17. A computer-program product, for training a convolutional neural network configured to morph content features of an input image with style features of a style image, comprising a non-transitory tangible computer-readable medium having computer-readable instructions thereon, the computer-readable instructions being executable by a processor to cause the processor to perform:

selecting a training style image;
extracting style features of the training style image;
selecting a training content image;
extracting content features of the training content image;
processing the training content image through the convolutional neural network to generate a training output image comprising the content features of the training content image morphed with the style features of the training style image;
extracting content features and style features of the training output image;
computing a total loss; and
tuning the convolutional neural network based on the total loss comprising a content loss, a style loss, and a regularization loss;
wherein tuning the convolutional neural network comprises tuning the convolutional neural network in part based on a regularization loss function generated using (1) a first equation $L_m = \Sigma_{C=1}^3 V_C[O]^T L V_C[O]$, and (2) a first matrix obtained using a second equation $$L_{(i,j)} = \sum_{k|(i,j)\in W_k} \left( \delta_{ij} - \frac{1}{|W_k|}\left(1 + \frac{1}{\frac{\varepsilon}{|W_k|} + \sigma_k^2}(I_i - \mu_k)(I_j - \mu_k)^T \right) \right);$$

wherein a matrix dimension of the first matrix is N×N, N is a total number of pixels of the training content image;
wherein L represents the first matrix; $L_{(i,j)}$ represents a value of an element in an i-th row and a j-th column of the first matrix; k stands for a k-th pixel; $W_k$ represents a window of pixels centered on the k-th pixel; $\delta_{ij}$ represents a Kronecker delta function; $\sigma_k^2$ represents a variance of values of elements in the window of pixels $W_k$; $|W_k|$ represents is a total number of pixels in the window of pixels $W_k$; $\varepsilon$ is a selected value; $I_i$ is a row vector representing an i-th row of a pixel matrix of the training content image; $I_j$ is a row vector representing an j-th row of the pixel matrix of the training content image; $\mu_k$ is a row vector having a vector dimension same as vector dimensions of the row vector $I_i$ and the row vector $I_j$; and each element of $\mu_k$ is an average value of elements in the window of pixels $W_k$;
wherein $L_m$ represents the regularization loss function; C represents a sequential number of channels of the training content image; O is a pixel matrix representing the training output image; $V_C[O]$ represent a vectorized version of the training output image O in a C-th channel.

* * * * *